US007631081B2

(12) United States Patent
Dantzig et al.

(10) Patent No.: US 7,631,081 B2
(45) Date of Patent: Dec. 8, 2009

(54) METHOD AND APPARATUS FOR HIERARCHICAL SELECTIVE PERSONALIZATION

(75) Inventors: Paul M. Dantzig, Scarsdale, NY (US); Daniel M. Dias, Mohegan Lake, NY (US); Arun Kwangil Ivengar, Yorktown Heights, NY (US); Philip Shi-Lung Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 774 days.

(21) Appl. No.: 10/789,087

(22) Filed: Feb. 27, 2004

(65) Prior Publication Data

US 2005/0193110 A1 Sep. 1, 2005

(51) Int. Cl.
*G06F 15/16* (2006.01)

(52) U.S. Cl. .................. 709/226; 709/203; 709/216; 709/219; 709/229; 370/229; 370/230; 711/117; 711/118; 711/122

(58) Field of Classification Search ............... 709/203, 709/216, 219, 226, 229; 370/229, 230; 711/117, 711/118, 122
See application file for complete search history.

(56) References Cited

U.S. PATENT DOCUMENTS

| 6,078,960 | A  | * | 6/2000  | Ballard ........................ 709/229 |
| 6,128,279 | A  | * | 10/2000 | O'Neil et al. ............... 370/229 |
| 6,167,438 | A  |   | 12/2000 | Yates et al. |
| 6,182,138 | B1 | * | 1/2001  | Aoki .......................... 709/226 |
| 6,438,652 | B1 | * | 8/2002  | Jordan et al. ................. 711/120 |
| 6,973,485 | B2 | * | 12/2005 | Ebata et al. .................. 709/219 |
| 2001/0037402 | A1 | * | 11/2001 | Schneider ..................... 709/236 |
| 2002/0198961 | A1 |   | 12/2002 | Krishnamurthy et al. |
| 2003/0108052 | A1 | * | 6/2003  | Inoue et al. ................. 370/399 |

FOREIGN PATENT DOCUMENTS

| JP | 2001-526814 A | 12/2001 |
| WO | 98/53410 A2 | 11/1998 |

OTHER PUBLICATIONS

J. Wang, "A Survey of Web Caching Schemes for the Internet," ACM Computer Communication Review (CCR), vol. 29, No. 5, 11 pages, Oct. 1999.

(Continued)

*Primary Examiner*—Jinsong Hu
(74) *Attorney, Agent, or Firm*—Kenneth R. Corsello; Ryan, Mason & Lewis, LLP (57) ABSTRACT

Techniques are provided for improved serving of content in a distributed data network. In one aspect of the invention, a technique for delivering content in a client-server system based on a request from a client comprises the following steps/operations. The request is obtained. A performance characteristic of at least one server or at least one cache of the client-server system is determined. Then, a level of data accuracy to be delivered to the client in response to the request is determined. The data accuracy determination is based on: (i) the determined performance characteristic of the at least one server or the at least one cache; and (ii) at least one preference associated with the client. The performance characteristic may comprise a load of the at least one server or the at least one cache. The level of data accuracy may comprise a level of personalization to be delivered to the client in response to the request. The at least one preference associated with the client may comprise at least one personalization preference.

14 Claims, 3 Drawing Sheets

OTHER PUBLICATIONS

J. Challenger et al., "Efficiently Serving Dynamic Data at Highly Accessed Web Sites," IBM Research Report No. RC22823, pp. 1-38, Jun. 2003.

T.F. Abdelzaher et al., "Web Server QoS Management by Adaptive Content Delivery," XP-002157975, pp. 216-225, May 1999.

D-G. Lee et al., "Addressing Server Latency and Capacity to Enable Fast and Affordable Wireless Image Data Services," XP-002300631, 8 pages, 2003.

W. Shi et al., "Workload Characterization of a Personalized Web Site—And Its Implications for Dynamic Content Caching," Technical Report: TR2002-829, XP-002300632, pp. 1-17, 2002.

* cited by examiner

METHOD AND APPARATUS FOR HIERARCHICAL SELECTIVE PERSONALIZATION

FIELD OF THE INVENTION

The present invention relates to distributed data processing systems and, more particularly, to distributed data processing systems for serving personalized content.

BACKGROUND OF THE INVENTION

"Personalization" in the context of distributed data networks involving clients and servers (such as the Internet or World Wide Web) is the term generally given to the process of serving content customized in some way to a requesting client. The basic mechanism for personalization in such data networks includes composing a Web page served on a Web server based on knowledge of the identity of the client.

A key problem with existing personalization technique, however, is that it can introduce significant overhead for producing content. Personalized content may require accesses to back-end databases which can consume significant central processing unit (CPU) cycles.

A number of commercial Web sites use some forms of personalization. For example, one Web site employs two levels of subscribers. The preferred status level may receive personalized content by going to the server. It may not matter what the load is on the site; clients of a given level may always get the same service level. If the system is heavily loaded, their performance may be impacted but to a lesser degree due to the use of dedicated servers. Non-preferred users may get whatever the system can support no matter if it is heavily loaded or lightly loaded. "Load" generally refers to the utilization of the Web site and/or the number of requests made for content associated with the Web site.

Web sites of weather or news related organizations typically support the concept of "extreme weather" or "big new story" situations. Such organizations may cut back on content of all types the more load they have on their Web sites. If they have no concept of preferred or non-preferred customers, personalized content simply becomes out-dated under these conditions.

Another Web site employs the concept of shifting servers if a particular category of content is getting too much load. No personalization or customer differentiation is used. Load is simply shifted based on degree of usage.

Thus, a need exists for improved serving of personalized content in a distributed data network.

SUMMARY OF THE INVENTION

The present invention provides techniques for improved serving of content in a distributed data network.

In a first aspect of the invention, a technique for delivering content in a client-server system based on a request from a client comprises the following steps/operations. The request is obtained. A performance characteristic of at least one server or at least one cache of the client-server system is determined. Then, a level of data accuracy to be delivered to the client in response to the request is determined. The data accuracy determination is based on: (i) the determined performance characteristic of the at least one server or the at least one cache; and (ii) at least one preference associated with the client.

The performance characteristic may comprise a load of the at least one server or the at least one cache. The level of data accuracy may comprise a level of personalization to be delivered to the client in response to the request. The at least one preference associated with the client may comprise at least one personalization preference. The at least one server and the at least one cache may form a hierarchy. The client-server system may comprise the World Wide Web, such that content may comprise one or more Web pages and the technique may further comprise the step/operation of creating a personalized Web page based on the determined level of accuracy.

In a second aspect of the invention, a technique for delivering content in a client-server system based on a request from a client comprises the following steps/operations. The request is obtained. A characteristic of at least one server and at least one cache of the client-server system is determined. Then, a level of data accuracy to be delivered to the client in response to the request is determined. The determination is based on: (i) the determined characteristic of the at least one server and the at least one cache; and (ii) at least one preference associated with the client.

In a third aspect of the invention, a technique for delivering content in a client-server system based on a request from a client comprises the following steps/operations. The request is obtained. A characteristic of at least one server or at least one cache of the client-server system is determined. Then, a level of personalization to be delivered to the client in response to the request is determined. The personalization determination is based on: (i) the determined characteristic of the at least one server or the at least one cache; and (ii) at least one preference associated with the client.

In a fourth aspect of the invention, a technique for providing a data serving service comprises a service provider providing a data serving service operative to: (i) obtain a client request; (ii) determine a performance characteristic of at least one server or at least one cache of the client-server system; and (iii) determine a level of data accuracy to be delivered to the client in response to the request, the determination being based on: (i) the determined performance characteristic of the at least one server or the at least one cache; and (ii) at least one preference associated with the client.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The present invention will be explained below in the context of an illustrative Internet or World Wide Web implementation. However, it is to be understood that the present invention is not limited to such an data network architecture. Rather, the invention is more generally applicable to any distributed data environment in which it would be desirable to serve personalized data to a client.

As illustratively used herein, the term "client" may generally refer to one or more computing systems (e.g., personal computer, personal digital assistant, cellphone, laptop, etc.) capable of making a request to a server (e.g., by connecting to a network to obtain data). A "client" may also occasionally refer to the individual(s) using the computing system (this will be clear from the circumstances). A "server" may generally refer to one or more computing systems capable of responding to a client request (e.g., by generating and serving content available on the network). A "cache" may generally refer to one or more computing systems capable of storing and also serving data efficiently and is typically deployed to improve performance.

As will be illustratively explained below, the invention provides techniques for providing data in a client-server environment (including Web environments) in which personalized content is served from one or more servers and one or more caches. The system selects the proper server(s) and cache(s) to provide personalization based on characteristics such as load on the system and client identity. In general, the degree of personalization of Web pages that can be achieved at a cache node is less than that possible at a server node. However, the improved personalization at a server node, relative to that at a cache, comes at a price. The performance of serving personalized pages at a cache is usually better than that at a server node. The invention makes use of this difference to optimize the degree of personalization based on selecting degree and location of personalization based on several factors.

Furthermore, in one embodiment, it is to be appreciated that the invention may be realized with one or more Web caches (having limited Web page personalization capability) and one or more Web servers (with capability of various levels of additional Web page personalization) arranged in a hierarchy. The Web cache(s) are interposed between the data network and the Web server(s).

There has been considerable work in the area of hierarchical caching for Web environments. The following references describe such work: J. Wang, "A Survey of Web Caching Schemes for the Internet," ACM Computer Communication Review (CCR), Vol. 29, No. 5, October 1999; and J. Challenger et al., "Efficiently Serving Dynamic Data at Highly Accessed Web Sites," IBM Research Report No. RC22823, June 2003, the disclosures of which are incorporated by reference herein. However, no past references on hierarchical caching describe how to use such systems for personalization.

In accordance with the present invention, a combination of several criteria may be used to determine where the personalization is done and the degree of personalization to be employed.

In an illustrative methodology described herein, the invention determines when a page is served from a cache using considerations based on personalization. Thus, even if a Web page is cached at a Web cache, the methodology may decide to serve the page from a Web server, depending on the degree of personalization that the methodology decides to achieve. While the Web page can be personalized at a cache, less information about the client may be available at the cache. For example, limited or no history of access information may be available for each client at the cache. The source Internet Protocol (IP) address of the client (or that of the firewall his request comes through) is known at the cache. The cache may process cookies, or uniform resource locator (URL) headers that may provide more information about the client.

One criterion for selective personalization that may be employed by the invention is that of the current load on the caches and the servers. If a Web server is lightly loaded, the methodology of the invention may favor personalization on the Web server. On the other hand, if the Web server is heavily loaded, the methodology of the invention may favor personalization at another entity. If the server has moderate load, the methodology of the invention may decide to still perform the personalization at the server, but to limit the degree of personalization so as to use less processing power at the server. If all caches and servers are loaded beyond a threshold, the methodology of the invention may serve the Web page without personalization to minimize the resources used.

Furthermore, the identity and class of the client may be used to determine the location and degree of personalization. As is known, the identity of the client may be carried using cookies or URL extensions, by hidden fields, or other mechanisms in the Web request. High priority clients for personalization may be favored over lower priority clients. Thus, load on the Web servers permitting, personalization for the high priority clients may be done on the Web servers; very low priority clients may not have any personalization at all, and could be fed pre-cached pages; clients with intermediate priority would be served from a server if the server load is not too high, and personalized at the cache if server load is higher.

Figure 1:
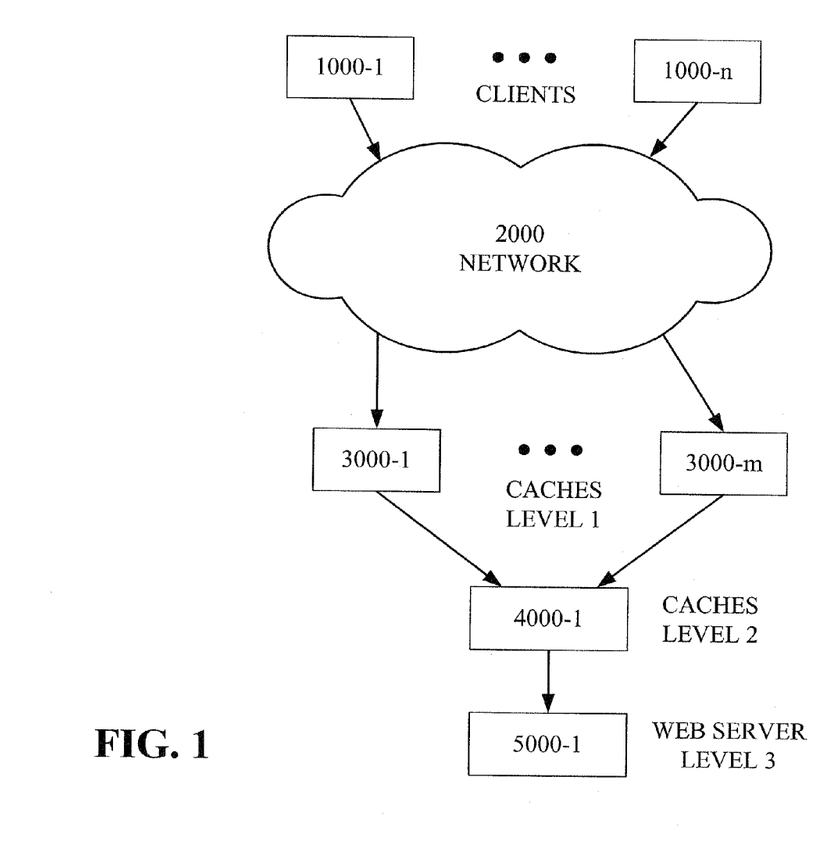
FIG. 1 is a block diagram illustrating a distributed data network architecture with which embodiments of the present invention may be implemented.

Referring initially to FIG. 1, a block diagram illustrates a distributed data network architecture with which one or more embodiments of the present invention may be implemented. As shown, the architecture may include a plurality of client nodes 1000-1, . . . , 1000-n) connected to network 2000 (e.g., World Wide Web). The architecture may also include a multilevel hierarchy formed by one or more caches and one or more servers. In the example shown in FIG. 1, level 1 (e.g., the lowest hierarchy level) includes a plurality of Web caches 3000-1, . . . , 3000-m, which are directly connected to network 2000. Level 2 includes Web cache 4000-1 connected to the level 1 caches. Level 3 (e.g., the highest hierarchy level) includes Web server 5000-1 connected to the level 2 cache. It is to be understood that more or less caches and Web servers may be employed at each level and the hierarchy may include more or less levels.

Figure 2:
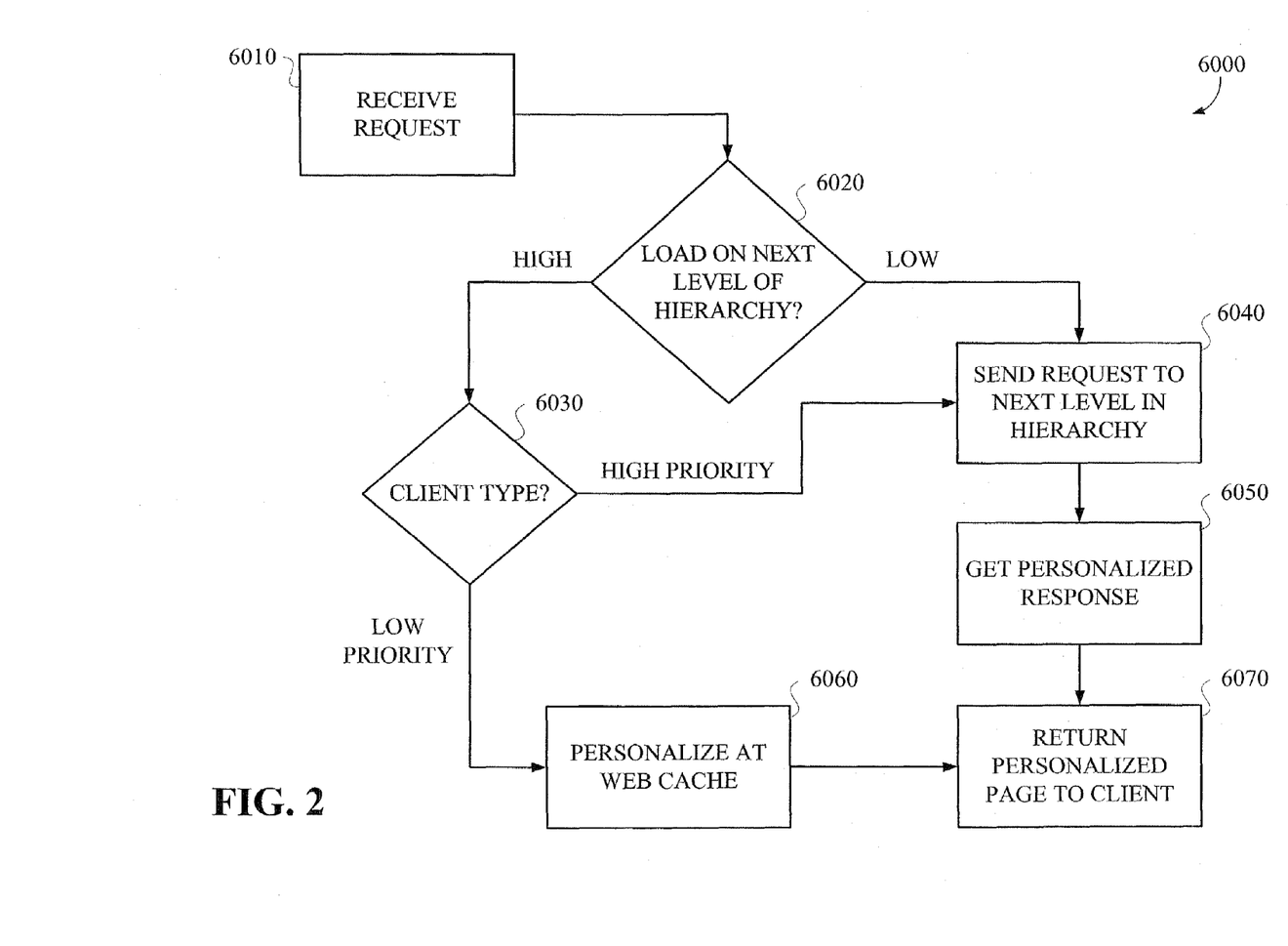
FIG. 2 is a flow diagram illustrating a methodology for serving personalized content in accordance with an embodiment of the present invention.

Referring now FIG. 2, a flow diagram illustrates a methodology for serving personalized content in accordance with an embodiment of the present invention. More particularly, FIG. 2 shows processing logic 6000 of a Web page request at a Web cache. It is to be understood that such methodology could be implemented at a cache at any level in the hierarchy.

In step 6010, a Web request is received at a Web cache. Note that if the cache is at the lowest level of the hierarchy, the request is directly from the client. Otherwise, the request is from the next lower level cache of the hierarchy. The load on the next level of the hierarchy is considered in step 6020. If the load is high (e.g., enough to increase response times by at least 50 percent), the client type is checked in step 6030. If the client type is of low priority, the personalization is performed at the Web cache in step 6060. Otherwise, the client request is sent to the next level of the hierarchy at step 6040.

In step 6050, the personalized response is received back from the cache in the next level of the hierarchy. In step 6070, the personalized page is returned to the client. This is done through the next lower level cache of the hierarchy, if the Web cache is not at the lowest level.

It is to be noted that for the cache at the highest level of the cache hierarchy (i.e., the portion of the overall system hierarchy that includes only the caches), no client type checking will be performed. All requests forwarded to the cache will be served. Since the lower level cache maintains information on the load of the higher level cache, it can avoid overloading the higher level cache.

It is also to be noted that the client can have multiple levels of priority. The priority threshold to forward the request to the next higher level cache is load dependent. For example, assume four levels of client priority. If the load of the higher level cache is at 30 percent (%) or less, all requests can be forwarded to the higher level cache. Between 30% and 50% load, only clients with a priority level of two or higher will be forwarded to the next level. Between 50% and 70% load, the priority threshold is at priority level three. Above 70% load, only a priority four client request will be forwarded to the next level.

One example of using the invention would pertain to personalizing a weather Web site that gets high loads during extreme weather (e.g., hurricanes). Such a Web site may be able to give customers very personalized and selectable content under normal conditions such as local golf course conditions, current local maps, local temperatures, etc. Customers to the site would be placed in different quality-of-service (QoS) classes. Customers in higher QoS classes would get preferred access to personalized data. When the site is subject to large numbers of users coming to the site during extreme weather conditions, the site could choose which customers it would give current personalized information versus perhaps personalized, but out-of-date, information.

So a preferred customer may always get his up-to-date personalized content even when the site is under very high load. A regular customer would receive all of his personalized information up-to-date when the site is lightly loaded but under heavy load his content would still be personalized but would only be updated at some interval (e.g., every fifteen minutes) and so would be out-of-date.

The site could even be set up to have hierarchical levels of caching based on various loads. So that general customers would receive out-of-date information (fifteen minutes old) from first level caches, the next level up customer would receive more up-to-date information (two minutes old) from the next level of caches, and the most preferred customers would receive up-to-date information directly from the server under almost all conditions.

The location and degree of personalization may depend on the Web page and/or port being requested. For instance, in an on-line business scenario, it may be deemed that request pages associated with ordering are to be favored for deep personalization. Or, there may be excess stock of some item, and browsers of certain other catalog pages are likely targets for advertising that item, possibly requiring personalization at the server. Those skilled in the art will readily appreciate that other criteria may be combined with the above in determining the location and degree of personalization to be performed for a Web page requested by a client. For instance, personalization could be dependent on a profile of client preferences, e.g., preference for lower response time over more personalized data. Or it could be length of a client session, favoring clients who stay on the site indicating that they like the site.

The decision to perform personalization can also take into account the type of personalization: (i) ad insertion; (ii) promotion (links within the site); and (iii) format of page which should only be done at the host.

Personalization is just one example of an application of the invention. More generally, the invention provides a methodology for providing differentiated accuracy of information. In some cases, accuracy of information may be the degree of personalization. In other cases, it may be something entirely different (e.g., degree of image resolution).

Figure 3:
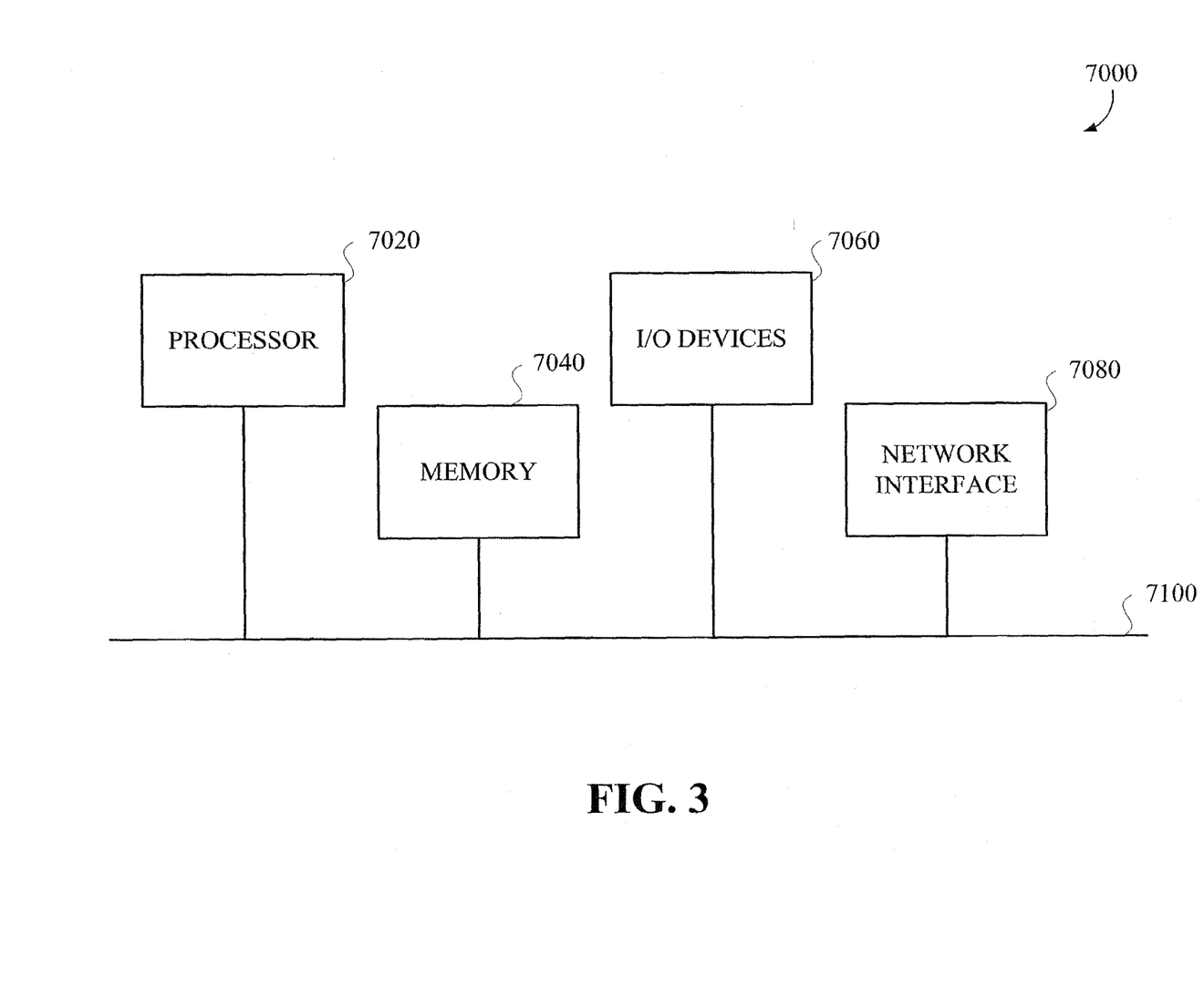
FIG. 3 is a block diagram illustrating a computing system with which embodiments of the present invention may be implemented.

Referring finally to FIG. 3, a block diagram illustrates an illustrative hardware implementation of a computing system in accordance with which one or more components/steps of the invention (e.g., methodologies described in the context of FIG. 2 as may be performed in accordance with the architecture of FIG. 1) may be implemented, according to an embodiment of the present invention. Thus, the computer system in FIG. 3 may be used to implement the caches and servers shown in FIG. 1. The computer system of FIG. 3 may also be used to implement each of the plurality of clients.

It is to be understood that the individual components/steps of the invention may be implemented on one such computer system, or more preferably, on more than one such computer system. In the case of an implementation on a distributed computing system, the individual computer systems and/or devices may be connected via a suitable network, e.g., the Internet or World Wide Web. However, the system may be realized via private or local networks. The invention is not limited to any particular network.

As shown, the computer system 7000 may be implemented in accordance with a processor 7020, a memory 7040, I/O devices 7060, and a network interface 7080, coupled via a computer bus 7100 or alternate connection arrangement.

It is to be appreciated that the term "processor" as used herein is intended to include any processing device, such as, for example, one that includes a CPU and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, etc.) for entering data to the processing unit, and/or one or more output devices (e.g., speaker, display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

The invention can be applied to caching in a variety of different contexts in addition to the Web. It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include storage media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

It is to be further appreciated that a service provider could provide aspects of the present invention in the following illustrative way. Clients could belong to different quality-of-service (QoS) classes. Clients belonging to high QoS classes get preferred access to personalized information. The service provider could provide different options for grouping clients into different QoS classes. One such method would be for levels of service to be specified via service level agreements.

During periods of light load, all clients could receive personalized information. During periods of heavier load, some fraction of clients could receive less personalized content. As load increases, more clients would receive less personalized information. Clients belonging to higher QoS classes would be affected the least. Conversely, as load decreases, more clients could receive more personalized information.

The service provider could monitor load on the system and control the degree of personalization in response to varying loads.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of delivering content in a client-server system based on a request from a client, comprising the steps of:
   obtaining the request;
   determining a characteristic of at least one server or at least one cache of the client-server system; and
   selecting a level of personalization associated with content to be delivered to the client in response to the request;
   wherein the level of personalization is selected from a plurality of levels of personalization comprising (i) at least one level wherein the content is personalized for the client at the least one server and (ii) at least one level wherein the content is personalized for the client at the least one cache;
   wherein the level of personalization is selected from the plurality of levels of personalization based on: (i) the determined characteristic of the at least one server or the at least one cache and (ii) at least one quality-of-service class associated with the client; and
   wherein the at least one server and the at least one cache comprise respective computing systems, each computing system comprising a processor coupled to a memory.

2. The method of claim 1, wherein the step of determining a performance characteristic comprises determining a load of the at least one server or the at least one cache.

3. The method of claim 1, wherein the selection of the level of personalization is based on at least one personalization preference.

4. The method of claim 1, further comprising the step of forming a hierarchy comprising the at least one server and the at least one cache before the step of determining a characteristic.

5. The method of claim 1, wherein delivering content in a client-server system comprises delivering content in the World Wide Web.

6. The method of claim 5, wherein delivering the content comprises delivering one or more Web pages.

7. The method of claim 5, further comprising the step of creating a personalized Web page based on the determined level of personalization.

8. Apparatus for delivering content in a client-server system based on a request from a client, comprising:
   a memory; and
   one or more processors coupled to the memory and operative to: (i) obtain the request; (ii) determine a characteristic of at least one server or at least one cache of the client-server system; and (iii) select a level of personalization associated with content to be delivered to the client in response to the request;
   wherein the level of personalization is selected from a plurality of levels of personalization comprising (i) at least one level wherein the content is personalized for the client at the least one server and (ii) at least one level wherein the content is personalized for the client at the least one cache;
   wherein the level of personalization is selected from the plurality of levels of personalization based on: (i) the determined characteristic of the at least one server or the at least one cache and (ii) at least one quality-of-service class associated with the client; and
   wherein the at least one server and the at least one cache comprise respective computing systems, each computing system comprising a processor coupled to a memory.

9. The apparatus of claim 8, wherein the performance characteristic comprises a load of the at least one server or the at least one cache.

10. The apparatus of claim 8, wherein the level of data accuracy comprises a level of personalization to be delivered to the client in response to the request.

11. The apparatus of claim 8, wherein the at least one server and the at least one cache form a hierarchy.

12. The apparatus of claim 8, wherein the client-server system comprises the World Wide Web.

13. An article of manufacture for use in delivering content in a client-server system based on a request from a client, comprising a computer readable storage medium containing one or more programs which when executed implement the steps of:
   obtaining the request;
   determining a characteristic of at least one server or at least one cache of the client-server system; and
   selecting a level of personalization associated with content to be delivered to the client in response to the request;
   wherein the level of personalization is selected from a plurality of levels of personalization comprising (i) at least one level wherein the content is personalized for the client at the least one server and (ii) at least one level wherein the content is personalized for the client at the least one cache;
   wherein the level of personalization is selected from the plurality of levels of personalization based on: (i) the determined characteristic of the at least one server or the at least one cache and (ii) at least one class associated with the client; and
   wherein the at least one server and the at least one cache comprise respective computing systems, each computing system comprising a processor coupled to a memory.

14. A system for delivering content in a client-server system based on a request from a client, comprising:
   a hierarchy of at least one cache and at least one server;
   wherein at least one of the at least one cache and the at least one server is operative to: (i) obtain the request; (ii) determine a characteristic of at least one server and at least one cache of the data network; and (iii) select a level of personalization associated with content to be delivered to the client in response to the request;

wherein the level of personalization is selected from a plurality of levels of personalization comprising (i) at least one level wherein the content is personalized for the client at the least one server and (ii) at least one level wherein the content is personalized for the client at the least one cache;

wherein the level of personalization is selected from the plurality of levels of personalization based on: (i) the determined characteristic of the at least one server or the at least one cache and (ii) at least one quality-of-service class associated with the client; and wherein the at least one server and the at least one cache comprise respective computing systems, each computing system comprising a processor coupled to a memory.

\* \* \* \* \*

UNITED STATES PATENT AND TRADEMARK OFFICE
CERTIFICATE OF CORRECTION

| | |
|---|---|
| PATENT NO. | : 7,631,081 B2 |
| APPLICATION NO. | : 10/789087 |
| DATED | : December 8, 2009 |
| INVENTOR(S) | : Dantzig et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1248 days.

Signed and Sealed this

Twenty-first Day of December, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,631,081 B2 | |
| APPLICATION NO. | : 10/789087 | |
| DATED | : December 8, 2009 | |
| INVENTOR(S) | : P. M. Dantzig et al. | |

It is certified that error appears in the above-identified patent and that said Letters Patent is hereby corrected as shown below:

Title page:

Item (75), Inventors: please change "Arun Kwangil Ivengar" to --Arun Kwangil Iyengar--.

Signed and Sealed this
Sixth Day of December, 2011

David J. Kappos
*Director of the United States Patent and Trademark Office*